United States Patent [19]

Usui

[11] Patent Number: 4,531,239
[45] Date of Patent: Jul. 23, 1985

[54] OPTICAL RECEIVER HAVING COLLISION DETECTION FUNCTION

[75] Inventor: Takeshi Usui, Tokyo, Japan

[73] Assignee: NEC Corporation, Tokyo, Japan

[21] Appl. No.: 488,877

[22] Filed: Apr. 26, 1983

[30] Foreign Application Priority Data

Apr. 30, 1982 [JP] Japan .................................. 57-73146

[51] Int. Cl.³ .............................................. H04B 9/00
[52] U.S. Cl. .................. 455/607; 340/825.5; 370/85; 370/94; 455/612; 455/619
[58] Field of Search ............... 455/606, 607, 608, 619, 455/612; 370/4, 85, 94, 93; 340/825.5

[56] References Cited

U.S. PATENT DOCUMENTS

| | | | |
|---|---|---|---|
| 4,229,831 | 10/1980 | Lacher | 455/619 |
| 4,234,968 | 11/1980 | Singh | 455/607 |
| 4,337,457 | 6/1982 | Tache | 455/608 |

OTHER PUBLICATIONS

Rawson et al.—"Transmissive Star Coupler"—Conf. Laser & Electrooptical Systems, San Diego, Calif.—Feb. 7-9, 1978, pp. 52-54.
Rawson et al.—"Fibernet II: An Active Star-Configured Fiber Optic Local Computer Network"—Fifth Topical Meeting on Optical Fiber Comm., Apr. 13-15, 1982, Phoenix, Ariz., pp. 22-23.

Primary Examiner—Joseph A. Orsino, Jr.
Attorney, Agent, or Firm—Sughrue, Mion, Zinn, Macpeak, and Seas

[57] ABSTRACT

A signal collision detection device for an optical receiver forming a part of an optical local area network which interconnects a number of optical transceivers using optical fibers. The signal collision detection device operates to inform the receiver whether it is receiving a signal from only one transmitter or simultaneously receiving signals from two or more network transmitters. The signal collision detection device includes at least a differentiating circuit, a decision circuit, and a collision detection circuit. The differentiating circuit, which has a time constant sufficiently small to discriminate the leading and trailing edges of incoming pulse signals, converts the incoming signal into a bipolar balanced code of pulses of one polarity corresponding to a rising edge and of the other polarity corresponding to a falling edge. The decision circuit detects the polarity of the pulses produced by the differentiator circuit and supplies this information to the collision detection circuit. The collision detection circuit monitors the positive and negative pulses and indicates that successive pulses are the same or opposite polarity. A single incoming signal is detected when successive pulses are of opposite polarities. An incoming signal composed of more than one signal is detected when successive pulses are of the same polarity.

8 Claims, 5 Drawing Figures

OPTICAL RECEIVER HAVING COLLISION DETECTION FUNCTION

BACKGROUND OF THE INVENTION

The present invention relates to an optical data transmission system and, more particularly, to an optical receiver applicable to an optical local area network which interconnects a number of optical terminals by optical fiber to permit them to transmit data therebetween.

Recently, the art of optical fiber communication has made rapid progress and found applications in various fields. Typical of the applications is a proposed optical local area network which effects transmission of data among a large number of optical terminals.

Advantages of such a network are that it is flexible and economical. Other advantages are that the use of nonconductive optical transmission lines safeguards the system against troubles due to electromagnetic interference and the like, and that the reliability of the network is excellent because the terminals, which is not either transmitting or receiving need not be in operation.

A randomly accessed local area network relies on distributed control and asynchronous packet transmission. Communication control for this type of system is usually implemented by a system in which each terminal monitors the presence/absence of a signal from another terminal and, if present, restrains transmission therefrom (see, for example, U.S. Pat. No. 4,063,220). This system, called Carrier Sense Multiple Access with Collision Detection (CSMA/CD), has to be constructed such that one transmitting terminal the presence/absence of a signal from another terminal as the presence/absence of signal collision. So long as a transmission line employed is of the type using coaxial cables or the like for communication by electric signals, signals from all the terminals will be received at a substantially common level and, therefore, signal collision will be found out with ease.

When it comes to light, however, the transmission loss in the optical fibers and optical couplers is so significant that the power received differs a great deal from one terminal to another. If the difference in power is insignificant, even an ordinary optical receiver made up of a photodetector, an amplifier and a decision circuit will successfully detect signal collision by monitoring the variation in received signal power (see, for example, an article entitled "Fibernet II: An Active Star-Configurated Fiber-Optic Local Computer Network with Data Collision Sensing" by Eric G. Rawson et al., Fifth Topical Meeting on Optical Fiber Communication, Apr. 13-15, 1982, OSA/IEEE, Phoenix, Ariz.). However, should the difference increase beyond a certain level, an intense optical signal would hide a less intense optical signal making the signal collision undetectable.

SUMMARY OF THE INVENTION

It is therefore an object of the present invention to provide an optical receiver which detects even the collision of a plurality of optical signals which greatly differ from each other in power.

An optical receiver embodying the present invention is of the type which receives optical pulse signals from a plurality of optical transmitters. Each pulse signal has been modulated in intensity with respect to two logical level. The optical receiver includes a photodetector. A differentiator differentiates a received signal detected by the photodetector and has a time constant smaller than a pulse width of the received signal. A decision circuit decides polarity of an output pulse signal from the differentiator. A circuit is provided for detecting an occurrence that a pulse common in polarity to the immediately preceding pulse has appeared in the output signal of the decision circuit.

In accordance with the present invention, the optical receiver identifies a received signal after differentiating it into a bipolar balanced code. This eliminates the influence of a change in DC level and other factors so that the leading and trailing edges of a weak optical signal can be detected even in the presence of an intense optical signal. Hence, signal detection can be accomplished even when received signals are at greatly different power levels.

PREFERRED EMBODIMENT OF THE INVENTION

Figure 1:
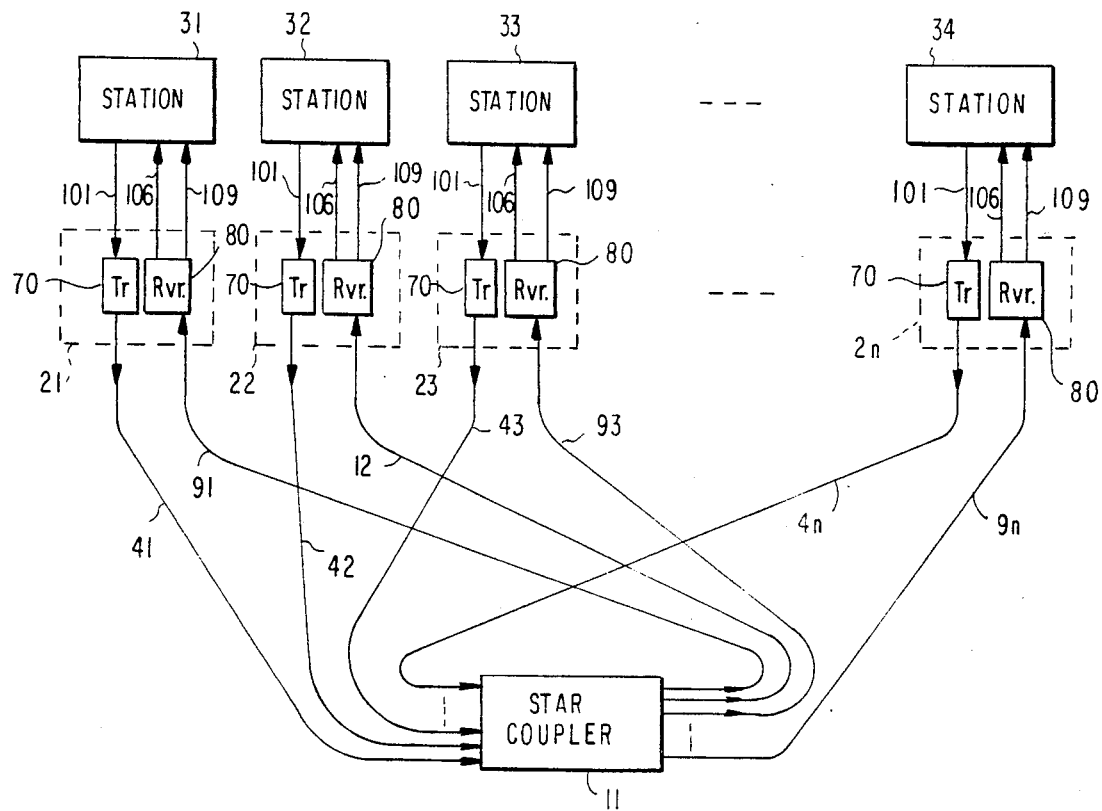
FIG. 1 is a schematic diagram of a star-configurated optical data transmission system to which the present invention is applicable.

Referring to FIG. 1 of the drawings, a data communication system is shown to which the optical receiver of the present invention is applicable. The system includes a plurality of independent optical transceivers $21-2n$ which are individually connected to an optical star coupler 11 by optical fiber cables $41-4n$ and $91-9n$. The transceivers $21-2n$ are connected to stations $31-3n$ respectively. Installed in each of the stations $31-3n$ are a general purpose computer, a microprocessor, a remote console, an auxiliary memory or the like terminal device. The optical star coupler 11 distributes light coming in through any input port thereof to all the output ports. Typical of such a start coupler may be a fiber mixing rod produced by fusing a plurality of optical fibers (see, for example, an article entitled "Transmission Star Coupler for Single Fiber Cables; Mixer Rod Power Distribution Inhomogeneities" by Eric. G. Rawson et al., Conference on Laser and Electrooptical Systems, Feb. 7-9, 1978, OSA/IEEE, San Diego, Calif., Digest of Technical Papers, pp. 52-54). Thus, when optical signals are simultaneously input into the star coupler 11 from a plurality of input ports, the signal distributed to all the output ports will be the mixture of the input signals.

Each of the transceivers $21-2n$ includes an optical transmitter 70 and an optical receiver 80. The transceiver 21, for example, causes its transmitter 70 to receive an electric data signal from the associated station 31 via a lead 101 and convert it into an optical data signal. This optical signal is fed by the optical fiber 41 to the star coupler 11. The receiver 80 is tied to all the transmitters via the optical fiber 91, star coupler 11 and optical fiber $42-4n$. Therefore, the transceiver 21 is capable of receiving an output of any one of the transceivers via the optical fiber 91. When a plurality of transmitters transmit optical signals at the same time, the signal input into the receiver 80 will be the mixture thereof. The other transceivers 22-2n are identical in configuration and operation with the transceiver 21 described above.

Each transceiver monitors the condition of the fiber network which constitutes the star network and, only when the network is not occupied by other data, it delivers desired data to the fiber network in the form of an optical signal.

Figure 2:
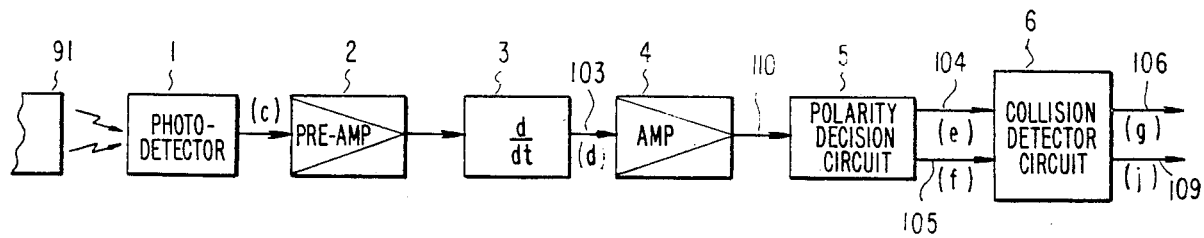
FIG. 2 is a block diagram of an optical receiver embodying the present invention.

Referring to FIG. 2, the optical receiver of the present invention is shown in block diagram. The optical receiver includes a photodetector 1, a preamplifier 2, a differentiator circuit 3, a main amplifier 4, a decision circuit 5 and a logical collision detector circuit 6. These devices are interconnected to each other by leads. The photodetector 1, which may be an avalanche photodiode, is capable of receiving both the light from other remote transmitters and the light from its own transmitter, each via the optical fiber cable 91. While the network is free from signal collision, each transmitter may continuously deliver a signal in the form of a data packet which consists of a string of bits.

Figure 3:
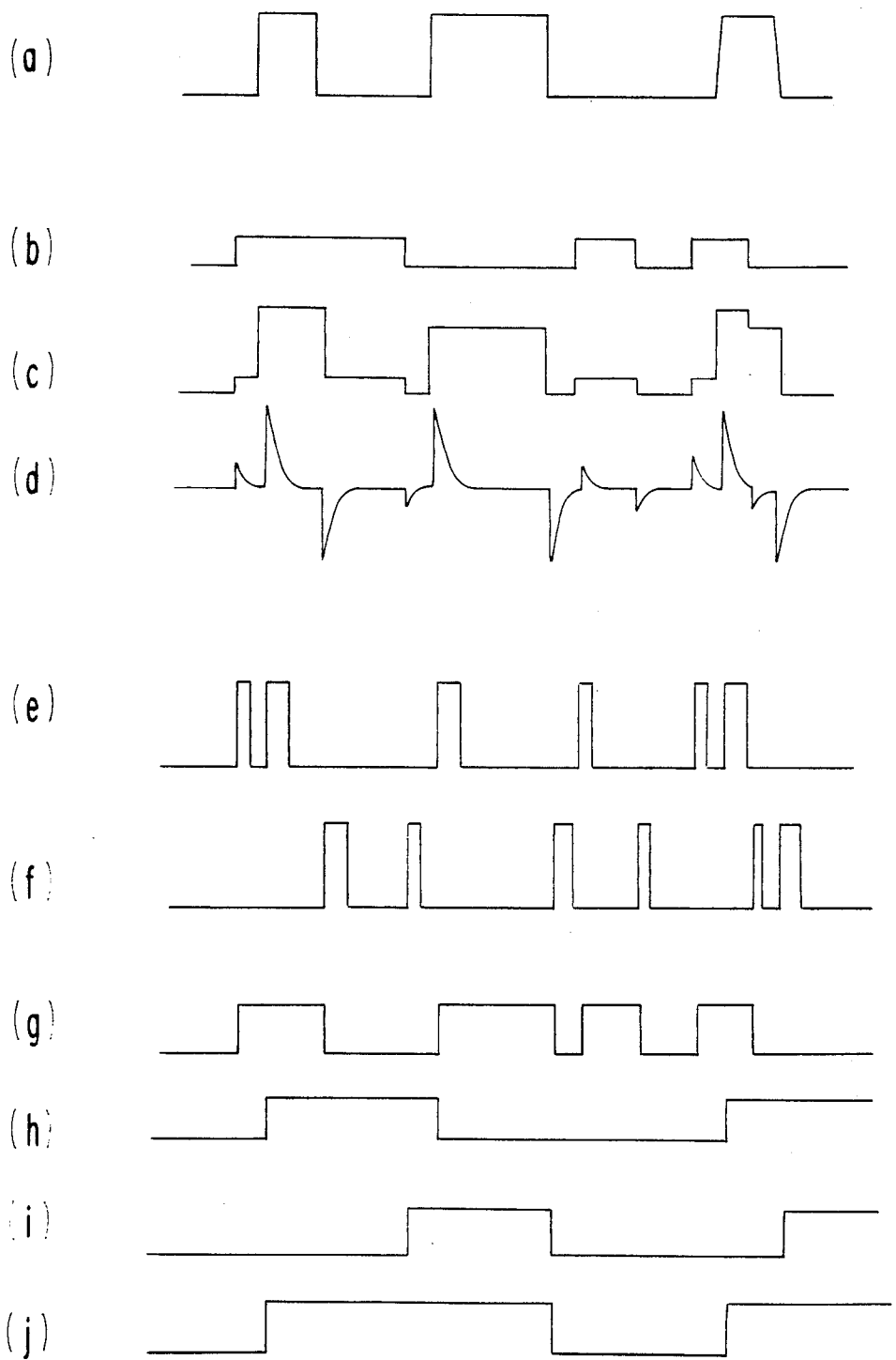
FIG. 3 is a timing chart showing signals which appear in various parts of the receiver of the present invention.

Referring also to FIG. 3, the photodetector 1 transforms an optical signal input via the cable 91 into an electric signal (c). Suppose that the signal (c) is the sum of a signal component (a) transmitted from the station's own transmitter 70 via the star coupler 11 and a signal component (b) transmitted from, for example, the transmitter 70 at the remote transceiver 23 via the star coupler 11. The signal (c) after the photoelectric conversion is amplified by the preamplifier 2 to a suitable level which does not entail saturation. The output of the preamplifier 2 is processed by the differentiator 3 to become a balanced bipolar signal (d) which then appears on a lead 103. The differentiator 3 may comprise a low frequency suppressing filter and, in this case, it is preferable to design the time constant corresponding to the cut-off frequency smaller than the pulse width of the incoming signal by more than a certain degree. The differentiated signal (d) is further amplified by the main amplifier 4 and fed to the decision circuit 5. The decision circuit 5 is adapted to discriminate the positive and negative pulses of the input signal from each other.

Figure 4:
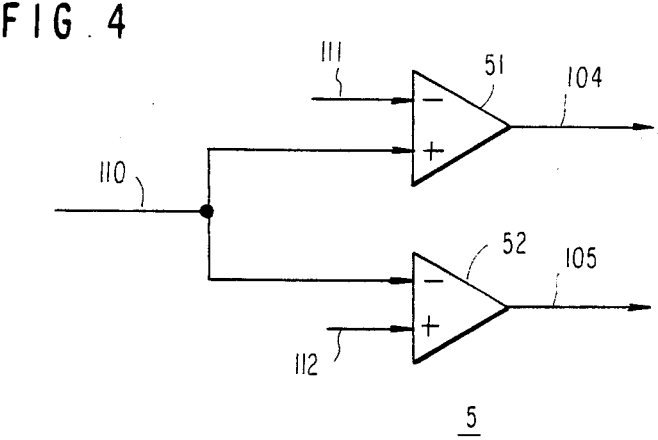
FIG. 4 is a block diagram of a decision circuit included in the receiver of the present invention.

As shown in FIG. 4, the decision circuit 5 comprises a pair of comparators 51 and 52. The signal appearing on a lead 110 is branched off to the noninverting terminal of the comparator 51 and the inverting terminal of the comparator 52, so that the positive and negative pulses are identified independently of each other.

The comparator 51 compares the input signal with a reference voltage higher than the average voltage of the input signal and fed to a line 111, delivering a positive logic signal (e) to a lead 104. The comparator 52 compares the input signal with a reference voltage lower than the average voltage of the input signal and fed to a line 112, delivering a negative logic signal (f) to a lead 105.

If the optical signal input into the receiver 80 is one transmitted from a single station, positive and negative pulses will be identified alternately. Therefore, the appearance of a plurality of consecutive pulses of the positive or negative polarity in the signal (e) or (f) means that a plurality of signals have occupied the network at the same time. Stated another way, signal collision is detectable by determining whether a plurality of positive or negative pulses have appeared serially. Because the identification in this receiver is performed after differentiating the signal into a balanced signal as described, it is free from the influence of a change in DC level and the like to overcome any substantial difference in power between incoming signals.

The two comparator outputs (e) and (f) are fed to the logic circuit 6 which is adapted to reproduce the received signal and extract a signal indicative of signal collision, as will be described later in detail.

Figure 5:
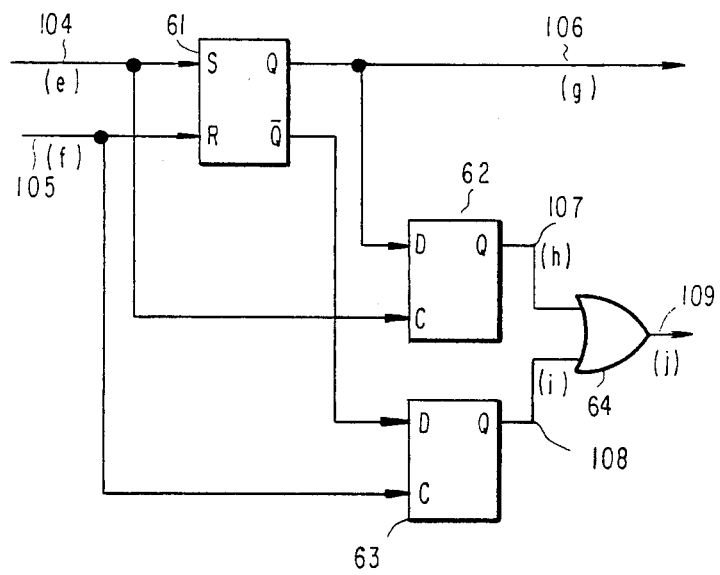
FIG. 5 is a block diagram of a logic circuit also included in the receiver of the present invention for detecting signal collision.

Referring to FIG. 5, the logic circuit 6 is constructed to feed a collision detection signal to a line 109 when a collision is detected and a signal from a remote transmitter to a line 106 when no collision is detected. As shown, the logic circuit 6 includes an SR flip-flop 61 and two D-type flip-flops 62 and 63. The signals (e) and (f) are respectively coupled to the S and R inputs of the SR flip-flop 61 and also to the clock terminals C of the D-type flip-flops 62 and 63. The Q and $\overline{Q}$ outputs of the flip-flop 61 are connected to the D inputs of the flip-flops 62 and 63, respectively.

In the circuitry shown in FIG. 5, the SR flip-flop 61 is set to the (logical) "1" level by the positive signal (e) and reset to "0" by the negative signal (f). Then, the Q output of the flip-flop 61 varies as shown in (g) of FIG. 3 when data packets are partly in collision with each other as illustrated. Both the D-type flip-flops 62 and 63 are triggered at the leading edges of pulses. In detail, while the flip-flop 62 is loaded with the Q output of the SR flip-flop 61 at the leading edges of the positive pulses (e), the flip-flop 63 is loaded with the $\overline{Q}$ output of the flip-flop 61 at the leading edges of the negative pulses (f). The outputs (h) and (i) of the flip-flops 62 and 63 are fed to an OR gate 64 via lines 107 and 108 respectively. The OR logic of the two inputs appears on a line 109 as a signal (j) shown in FIG. 3. With this arrangement, while positive and negative pulses alternate each other, the outputs (h) and (i) of the D-type flip-flops are commonly "0" level and so is their OR. When a train of positive or negative pulses appear continuously, the output of the flip-flop 62 or 63 becomes "1" level making their OR output "1". Therefore, the collision detection signal on the output 109 of the gate 64 assumes "1" level under the collision condition and the "0" level under the noncollision condition. The signal on the line 109 will be reset from "1" to "0" level when three or more positive and negative pulses have regularly alternated each other. Although this logic circuit may fail to detect collision on the instant depending upon the content of signals, it can still detect it within an allowable period of time because signals usually differ in content and phase.

It should be born in mind that the logic circuit shown in FIG. 5 is only illustrative and may be replaced with any other suitable circuitry capable of detecting continuation of pulses of a same polarity.

Each signal component (a) or (b) shown in FIG. 3 represents part of a data packet. The station is furnished with an interface stage which discards the output signal (g) of the logic circuit 6 if the collision detection signal (j) becomes "1" even for part of the packet under the "receive mode" of the transceiver, while accepting the signal (g) only when the collision signal (j) remains "0" throughout the packet. While the transceiver is in the "wait" state for transmission, it monitors both the signals (g) and (j) and starts transmission when both of them have become "0" level. In the "transmit" mode, the transceiver monitors the collision detection signal and, in response to collision, remains in the "wait" state without transmitting any data.

Various modifications will become possible for those skilled in the art based upon the teachings of the present disclosure without departing from the scope thereof. For example, the preamplifier 2 and main amplifier 4 shown and described may be omitted and this would not effect the collision detection even if the difference in power between received signals were substantial. While the embodiment has employed a star-configured optical data transmission network, the present invention is also applicable to a network of the bus type.

What is claimed is:

1. An optical receiver for use in collision detection of optical signals comprising:
    means for detecting an optical signal and for converting said detected signal into an electrical signal;
    means for differentiating the electrical signal to produce a differentiated signal of electrical pulses;
    means for determining the polarity of the pulses in the differentiated signal; and
    means responsive to said determining means for providing an indication of signal collision when successive pulses of said differentiated signal are of the same polarity.

2. In a receiver adapted for connection with other receivers in a network of transmitters and receivers communicating with each other, a signal collision detection device for signaling the receiver when pulse signals from more than one transmitter are simultaneously received, said signal collision detection device comprising:
    means for receiving signals from said transmitters;
    means for differentiating said received signals to produce a bipolar pulse code;
    means for detecting the polarity of the pulses in said bipolar pulse code; and
    means responsive to said detecting means for providing an indication of signal collision when successive pulses of said bipolar pulse code are of the same polarity and for providing an indication that only a single signal has been received when successive pulses are of opposite polarity.

3. The signal collision detection device of claim 2 wherein said signals are optical signals and wherein said means for receiving include a photodetector.

4. The signal collision detection device of claim 2 wherein said means for differentiating comprises a low frequency suppressing filter.

5. The signal collision detection device of claim 2 wherein said detecting means comprises first and second comparators, said first comparator receiving said bipolar pulse code at a non-inverting input thereto, its inverting input receiving a first reference potential, said second comparator receiving said bipolar pulse code at an inverting input thereto, its non-inverting input receiving a second reference potential.

6. The signal collision detection device of claim 5 wherein
    said means for indicating comprises a first flip-flop, one input thereto being connected to receive the output from the first comparator means, a second input being connected to receive the output of said second comparator means, a second flip-flop, one input thereto being connected to receive a non-inverted output of said first flip-flop, the other input of said second flip-flop being connected to receive the output from said first comparator, a third flip-flop, one input thereto be connected to receive the inverted output of said first flip-flop, the other input to said third flip-flop being connected to receive the output from said second comparator, and an OR circuit, corresponding outputs from each of said second and third flip-flops being connected as inputs to said OR circuit;
    whereby the output of said said OR circuit is a logic signal having a first level when the received signal is a single signal and a second level when the received signal is composed of more than one simultaneously received signal.

7. The signal collision detection device of claim 3 further including a preamplifier means coupled between said photodetector and said differentiating means, and a main amplifier coupled between said differentiating means and said detecting means.

8. In a network of transmitters and receivers communicating with each other, each of said network receivers having included therein a signal collision detection device as claimed in claim 1, said network further including a star coupler and a plurality of optical fiber cables, each transmitter of the network being connected to the star coupler by means of at least one optical fiber cable, each receiver of the network being coupled to the star coupler by means of at least one optical fiber cable.

* * * * *

UNITED STATES PATENT AND TRADEMARK OFFICE
CERTIFICATE OF CORRECTION

PATENT NO.    : 4,531,239
DATED         : July 23, 1985
INVENTOR(S)   : Takeshi USUI It is certified that error appears in the above-identified patent and that said Letters Patent is hereby corrected as shown below:

Column 1, line 22, "terminal, which is not" should be --terminals, which are not--;

line 33, after "terminal" insert --detects--;

Column 2, line 3, delete "decides polarity" and insert therefor --decides the polarity--;

line 47, delete "start" and insert therefor --star--.

Signed and Sealed this

Thirty-first Day of December 1985

[SEAL]

Attest:

DONALD J. QUIGG

Attesting Officer

Commissioner of Patents and Trademarks